UNITED STATES PATENT OFFICE.

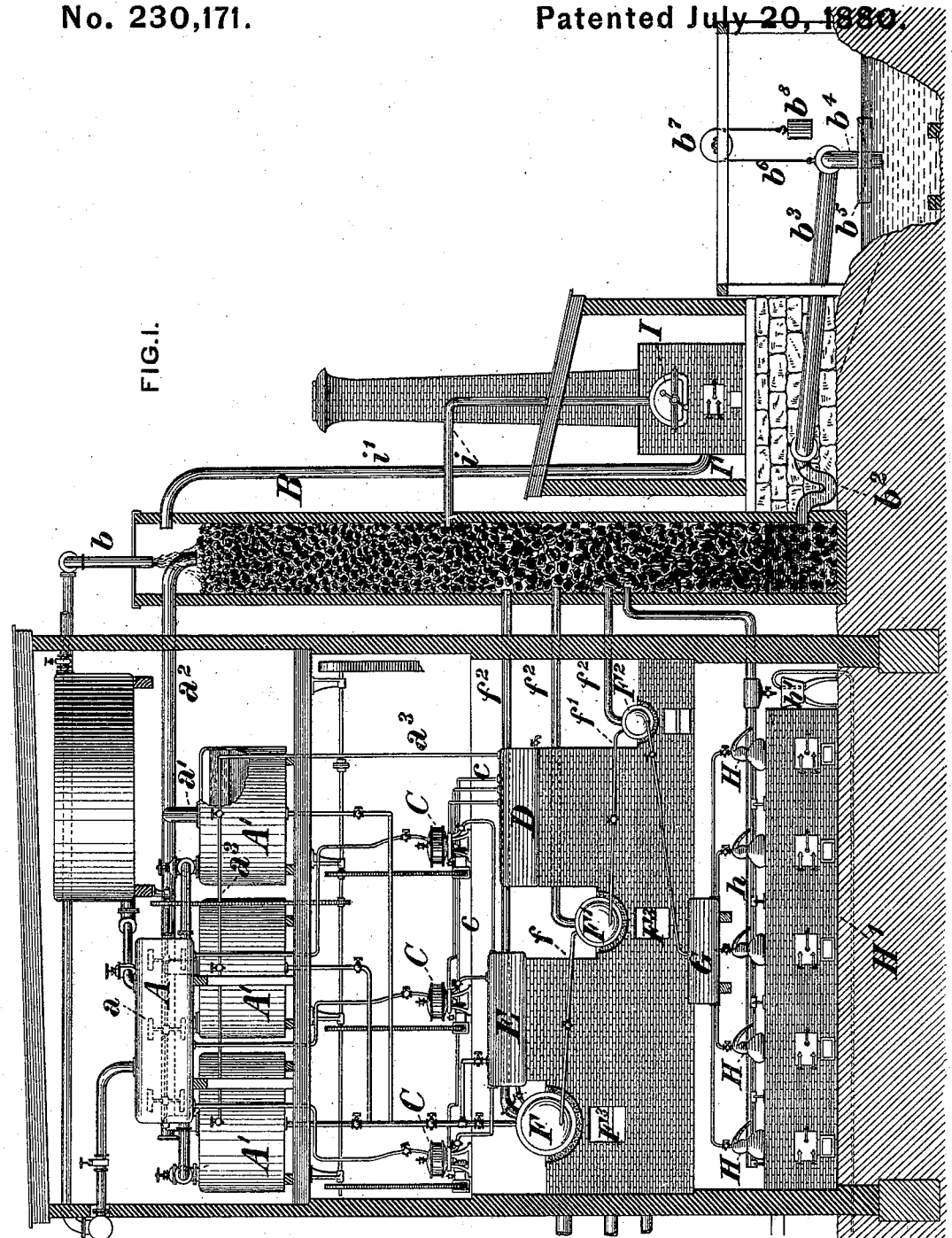

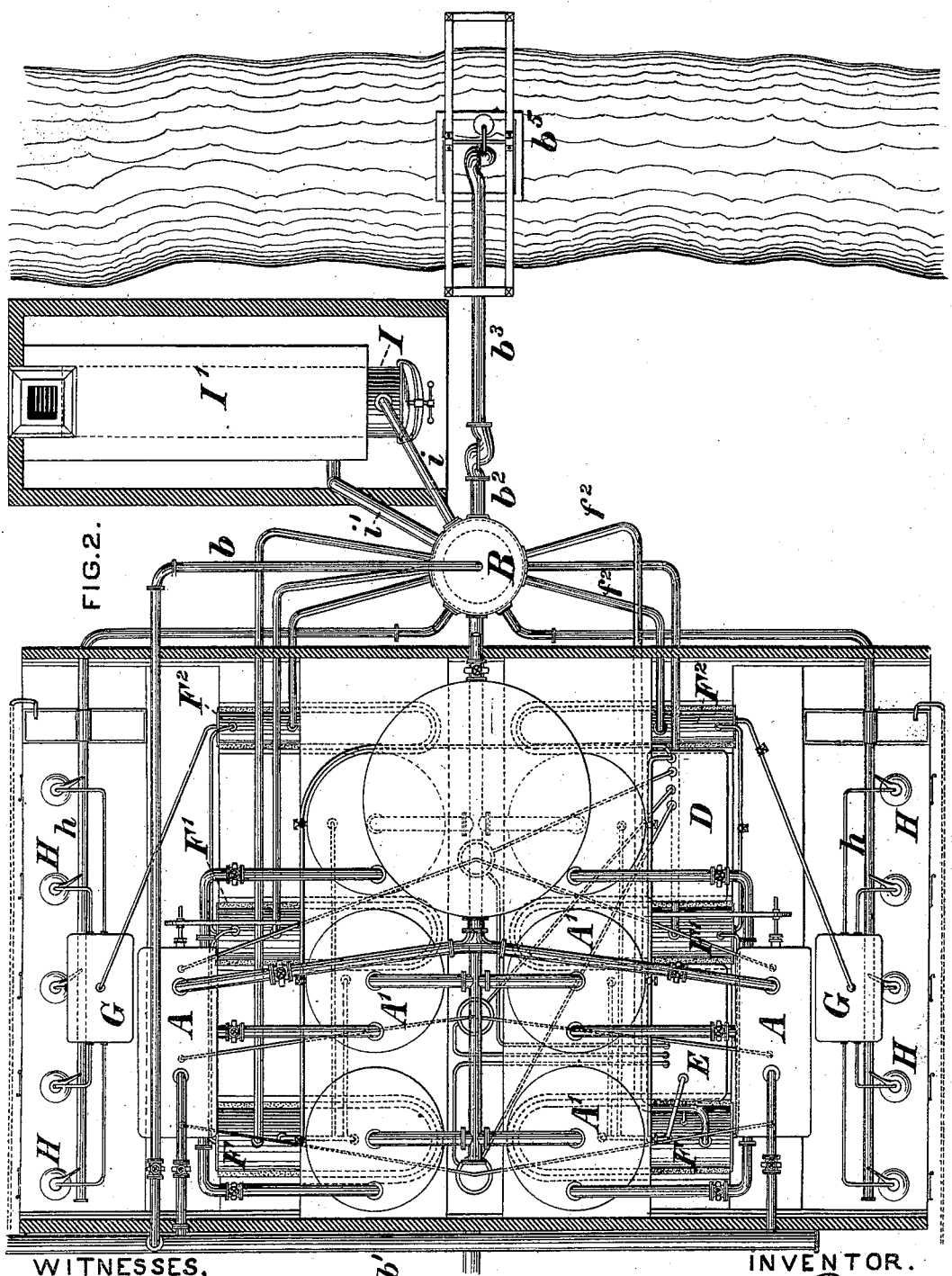

HENRY BOWER, OF PHILADELPHIA, PENNSYLVANIA.

PROCESS OF AND APPARATUS FOR TREATING RESIDUUM FROM PETROLEUM-REFINERIES.

SPECIFICATION forming part of Letters Patent No. 230,171, dated July 20, 1880.

Application filed April 22, 1880. (No model.)

*To all whom it may concern:*

Be it known that I, HENRY BOWER, of the city and county of Philadelphia, in the State of Pennsylvania, have invented certain new and useful Improvements in Processes and Apparatus for Treating Residuum from Petroleum-Refineries, of which improvements the following is a specification.

In the refining of petroleum, as ordinarily practiced upon a large scale in the United States, a residuum known as "sludge acid" is produced, this waste product consisting of a mixture of spent sulphuric acid with the hydrocarbons and carbonaceous matters which the acid has taken up from the petroleum in the refining process. The sludge acid, which contains a considerable amount of sulphuric acid susceptible, after proper treatment, of commercial use, is, in the condition in which it is removed from the stills, a thick blackish liquid of very disagreeable odor, and being, in such condition, not only useless but detrimental to vegetable and animal life, the removal and utilization of the sulphuric acid which it contains, and the neutralization of its objectionable properties, are important for sanitary as well as for commercial considerations. As heretofore conducted such operations have been attended with considerable expense and with but partial success, due principally to the difficulties met with in preventing the escape of noxious vapors, which not only constitute a nuisance in the vicinity of the establishment, but are diffused to long distances therefrom, and in separating free carbon from the oily constituents.

The object of my invention is to enable the treatment of sludge acid to be conducted in a practical and effective manner, and upon as large a scale as may be required, with entire freedom from the escape of offensive gases or vapors into the atmosphere, and with the special results of recovering a large percentage of sulphuric acid, available for use as an article of commerce, and rendering the residual products wholly innocuous.

To these ends my improvements consist in a novel process of treating the sludge-acid residuum, and in devices for the practice of such process, all as hereinafter more fully set forth.

In the accompanying drawings, Figure 1 is a view, in elevation, showing an arrangement of apparatus for the practice of my invention, and Fig. 2 a plan or top view of the same.

In the practice of my invention the sludge acid, as received from the oil-refineries, is first washed with water and its oily constituents separated from the acid solution. This may be effected by mixing it with about one-half its bulk of water in lead-lined vessels A, each having an internal mixer or agitator, $a$, and thence leading the mixture into lead-lined settling-tanks A', within which it is allowed to remain until by gravitation the heavier acid solution settles to the bottom of the tanks and the lighter oily portions separate and float on the top.

The tanks A and A' have covers over their tops, and the cover of each is connected by a pipe, $a'$, with a flue, $a^2$, by which the gases which arise from the mixture within the tanks (the same being chiefly sulphurous acid and hydrocarbon vapors) are conducted into a condensing column or tower, B, within which they are condensed by the action of a stream of cold water supplied from a pipe, $b$, leading from a main, $b'$, or a supply-tank.

The column B is filled with fragments of coke, pumice-stone, or the like, through which the supply of condensing-water percolates in numerous minute streams, so as to expose as large an amount of condensing-surface as practicable to the incoming gases.

Instead, however, of effecting the separation by gravitation in the tanks A', as above described, I prefer, with a view to economy of time, to employ centrifugal force for the purpose, using to that end one or more suitable centrifugal machines, C, of a construction analogous to that which has been heretofore proposed for separating mingled liquids of different specific gravities, as cream and milk.

In addition to its greater rapidity, the employment of a centrifugal machine embodies the further advantage of admitting of the washing of the mixture with water to any desired extent, so that the oily constituents may be entirely freed from the acid and be reduced to proper condition to be returned to the refinery for redistillation. The oily constituents are led from the tanks A or centrifugal machines C, by pipes $a^3$ and $c$ respectively, to an oil-tank, D, from which they are drawn, to be removed as required.

The separated sulphuric-acid solution contains a considerable amount of carbonaceous matter, which it is desirable should be thoroughly removed in order to prevent the decomposition of portions of the sulphuric acid and the conversion thereof into sulphurous acid and water by combination with the carbon during the subsequent distillation of the solution. In order to effect the separation of the carbonaceous matter in a speedy and economical manner the acid solution is led from the tanks A or centrifugal machines C, as the case may be, to a tank or receptacle, E, from which it is drawn in regulated quantities from time to time into the first of a series of concentrators, F F' $F^2$, each of which is a closed cylindrical leaden vessel provided with a movable head or door and set in a sand-bath over a furnace, $F^3$. I consider it most desirable to employ six concentrators, placed in double sets of three each, on independent furnaces, and being without casings or coverings around their upper surfaces, so that one set may be readily cooled while the other is in operation.

The concentrators F F' $F^2$ of each set are of relatively decreasing capacity—as, for example, one thousand five hundred gallons, seven hundred and fifty gallons, and three hundred and seventy-five gallons, respectively—and are placed at different levels and connected by pipes $f f'$, each provided with a proper cock or valve, the arrangement being such that the acid solution, after being subjected to heat and partially concentrated in the first concentrator, can be drawn therefrom to and similarly treated consecutively in the second and in the third, being brought in the latter to as high strength as can be attained in a leaden vessel—say about 60° Baumé. The vapors evolved in the operation are carried off by pipes $f^2$ to the condensing-column B, or to a similar column specially provided, and the carbonaceous matters which remain in the several concentrators are removed therefrom through the end doors or heads, to be treated as presently to be described, one set being allowed to cool to enable the removal to be effected without the evolution of offensive vapors and without interfering with the operation of concentration in the other set. The condensing-column serves the additional function of creating a partial vacuum in the concentrators, and correspondingly lowering the boiling-point of the acid solution, the effect of which is to decrease the loss of sulphuric acid by retarding its decomposition in presence of carbon, such decomposition being accomplished more readily at higher temperatures.

The sulphuric-acid solution, in the state of concentration to which it is brought in the last concentrator, $F^2$, of each series, is led therefrom to a receptacle, G, from which it is drawn off at proper intervals into glass or platinum retorts H, set over a furnace, H', in which retorts it is further concentrated, and finally distilled, sulphuric acid of at least 66° Baumé, suitable for commercial use, being produced.

To prevent the escape of vapors during the distillation the necks of the several retorts are connected to a common receiving-pipe, $h$, by which the vapors are led to and condensed in a condensing-column, and from which the distilled sulphuric acid is drawn into a receiver, $h'$, and thence siphoned off into the carboys, in which it is delivered to the consumer. The retorts are, by preference, to be heated by a gas-furnace, by which a more uniform and more easily regulated heat may be imparted to them than by the combustion of solid fuel in an ordinary furnace.

The carbonaceous matter which is removed from the concentrators F F' $F^2$ is placed in a wagon and conveyed to a decomposing-retort, I, of iron, placed over a furnace, I', within which retort it is heated to a dull-red heat. In this operation the remaining sulphuric acid is decomposed, passing off as sulphurous acid mixed with hydrocarbon vapors, by a pipe, $i$, leading to the condensing-column, and the solid carbon remains in and is removed from the retort I. The mixture of sulphurous acid and hydrocarbon vapors is much more readily condensed in the column than the vapors alone, on account of the greater solubility of the mixture in water, and the decomposition can be fully effected without the escape of vapors into the atmosphere. Light hydrocarbons, which fail to be condensed in the column B, are conducted therefrom by a pipe, $i'$, to the furnace I', and are consumed therein.

The condensed vapors and wash-water are led from the condensing-column B into an apparatus by which they are continuously discharged at a regulated depth below the surface of running water, so as to be so far diluted thereby as to prevent any surface exhalations.

A construction which I have found in practice to give satisfactory results is as follows: A pipe, $b^2$, having a goose-neck or trap, opens at one end into the condensing-column B, near the bottom thereof, and has its opposite end connected to an inclined pipe, $b^3$, by a joint, which permits the pipe $b^3$ to vibrate in a vertical plane. The opposite end of the pipe $b^3$ is similarly connected to the upper end of a vertical pipe, $b^4$, which is secured upon a float, $b^5$, the lower end of the pipe $b^4$ being immersed at a desired distance below the level of a stream or current of water upon which the float is supported. The float $b^5$ is connected by a cord, $b^6$, passing over a pulley, $b^7$, with a counterbalance, $b^8$, by which the float is relieved of the weight of the pipes, and, by reason of the flexible joints between said pipes, is free to follow the fluctuations in the level of the water, so that the discharge-opening of the pipe $b^4$ always remains at the same distance below the same.

Where the discharge is made into a tidal river or other stream, subject to variations of level, the maintenance of a uniform depth of discharge is of material importance, and by the construction above described is effectually secured.

In the practice of my invention it will be seen that the sludge acid is, by a process which can be conducted without detriment or nuisance, resolved into sulphuric-acid solution, which is concentrated and recovered for use, liquid hydrocarbon, which is collected for redistillation, vapors of sulphurous acid and hydrocarbons, which are condensed and carried off in running water, and solid carbon.

The apparatus hereinbefore described is suitable for the practice of the several operations which are to be performed; but it is obvious that various modifications in the details thereof may be made without departing from the spirit of my invention or involving any substantial variation from its principle and mode of operation.

I claim as my invention and desire to secure by Letters Patent—

1. The process of recovering sulphuric acid, oily ingredients suitable for redistillation, and solid carbon from the sludge-acid residuum of petroleum-refineries, which consists in subjecting the constituents of sludge acid to the successive operations of washing, mechanical separation, concentration, and distillation, and simultaneously condensing the waste vapors and discharging the products of condensation beneath the surface of running water, substantially as set forth.

2. The process of recovering sulphuric acid from the sludge-acid residuum of petroleum-refineries, which consists in first washing the sludge acid with water in covered tanks or vessels, then mechanically separating the sulphuric-acid solution and carbonaceous matters from the oily ingredients, then separating the sulphuric-acid solution from the carbonaceous matters by successively applying heat in the several members of a series of leaden concentrators, and finally concentrating and distilling the separated sulphuric-acid solution in glass or platinum retorts, substantially as set forth.

3. The process of recovering oily ingredients suitable for redistillation from the sludge-acid residuum of petroleum-refineries, which consists in first washing the sludge acid with water in covered tanks or vessels, then mechanically separating the sulphuric-acid solution and carbonaceous matters from the oily ingredients, and finally drawing off the separated oily ingredients into a tank or receptacle, substantially as set forth.

4. The combination, in an apparatus for the treatment of residuum from petroleum-refineries, of a covered mixing-tank, a series of closed concentrators placed above a furnace and connected by pipes to admit of the successive application of heat to a liquid therein, a glass or platinum retort placed above a heating-furnace and receiving a supply of liquid from the last of the series of concentrators, and a condensing column or tower, substantially as set forth.

5. The combination, in an apparatus for the treatment of residuum from petroleum-refineries, of a covered mixing-tank, a condensing column or tower connected by a pipe with said tank, and a centrifugal machine to which liquid is supplied from said tank, substantially as set forth.

6. The combination, in an apparatus for the treatment of residuum from petroleum-refineries, of a series of closed concentrators placed at different levels above a heating-furnace and connected by valved pipes, each concentrator being provided with a movable head or door, an iron retort and heating-furnace for the distillation of carbonaceous matters drawn from the concentrators, and a condensing column or tower connected by a pipe with each of the concentrators and the distilling-retort, substantially as set forth.

7. The combination, in an apparatus for the treatment of residuum from petroleum-refineries, of a mixing-tank, a concentrator, a distilling-retort, a condensing column or tower, and a device, consisting of a trapped pipe leading from the condensing-column to a vibratable pipe which is connected by end joints with the trapped pipe of the column and with a vertical discharge-pipe secured upon a counterbalanced float, whereby the lower opening of the discharge-pipe is maintained at a regulated depth below the surface of running water, substantially as and for the purpose set forth.

HENRY BOWER.

Witnesses:
J. SNOWDEN BELL,
WALTER S. GIBSON.